United States Patent
Hännikäinen et al.

(10) Patent No.: US 7,756,990 B2
(45) Date of Patent: Jul. 13, 2010

(54) CONFIGURABLE PROTOCOL ENGINE

(75) Inventors: Marko Hännikäinen, Pirkkala (FI); Petri Kukkala, Tampere (FI); Timo D. Hämäläinen, Kangasala (FI)

(73) Assignee: Nokia Corporation, Espoo (FI)

( * ) Notice: Subject to any disclaimer, the term of this patent is extended or adjusted under 35 U.S.C. 154(b) by 412 days.

(21) Appl. No.: 10/577,539

(22) PCT Filed: Oct. 29, 2003

(86) PCT No.: PCT/FI03/00803

§ 371 (c)(1),
(2), (4) Date: Feb. 21, 2007

(87) PCT Pub. No.: WO2005/041527

PCT Pub. Date: May 6, 2005

(65) Prior Publication Data

US 2008/0039055 A1   Feb. 14, 2008

(51) Int. Cl.
*G06F 15/16* (2006.01)

(52) U.S. Cl. .................................. 709/230
(58) Field of Classification Search ........ 709/201, 709/223, 226, 230, 224; 719/314; 370/469
See application file for complete search history.

(56) References Cited

U.S. PATENT DOCUMENTS

| | | | | |
|---|---|---|---|---|
| 5,903,754 A | * | 5/1999 | Pearson | 719/310 |
| 6,801,943 B1 | * | 10/2004 | Pavan et al. | 709/226 |
| 2001/0015984 A1 | * | 8/2001 | Lenz et al. | 370/469 |
| 2003/0174731 A1 | * | 9/2003 | Tafazolli et al. | 370/469 |
| 2004/0064760 A1 | * | 4/2004 | Hicks et al. | 714/43 |
| 2004/0139088 A1 | * | 7/2004 | Mandato et al. | 707/100 |
| 2005/0238050 A1 | * | 10/2005 | Pung et al. | 370/469 |

FOREIGN PATENT DOCUMENTS

| | | |
|---|---|---|
| EP | 0 289 248 | 11/1988 |
| WO | WO 03/027884 A1 | 4/2003 |
| WO | WO 03/102806 A1 | 12/2003 |

OTHER PUBLICATIONS

"Design of a generic Protocol Stack for an Adaptive Terminal", Matthias Siebert, Karlsruhe Workshop on Software Radios, http://www.comnets.rwth-aachen.de/~mst, Mar. 2000, 5 pgs.

"An Extensible End-to-End Protocol and Framework", K. L. Calvert et al., College of Computing, Georgia Institute of Technology, 1995, 15 pgs.

* cited by examiner

*Primary Examiner*—J Bret Dennison
(74) *Attorney, Agent, or Firm*—Harrington & Smith (57) ABSTRACT

A configurable protocol engine (CPE) capable of constructing (110) a desired protocol structure (112) according to the received configuration information. In addition, the CPE schedules the processing of received service primitives according to the priority levels thereof. The configuration information may include service requirements (102), indications of hardware and software resources (106, 108), and the required QoS (Quality of Service, 104) level. The CPE may be implemented as software, hardware, or as a combination of both.

20 Claims, 8 Drawing Sheets

CONFIGURABLE PROTOCOL ENGINE

FIELD OF THE INVENTION

The present invention relates generally to communication systems. In particular the invention concerns communication protocols and configurability thereof

BACKGROUND OF THE INVENTION

Many backbones of modern communication such as GSM (Global System for mobile communications) and UMTS (Universal Mobile Telecommunications System) wireless systems and undoubtedly the Internet as the most adopted wired data network transfer multiple types of data over a number of different interfaces by utilizing a plurality of protocols. Concerning both payload data and signalling transfer, the development of protocols has been separated in many diverging directions naturally depending on the various requirements originally set for the specific protocol under development. A protocol as an entity can be concretised as a composition of rules describing how to transfer data across the network and the functionality to implement the data transfer in practise.

As modern applications and the increased amount of data traffic in general put more and more pressure on the used protocols, especially the efficiency of a protocol implementation used in the transport system should be optimized. The protocol implementation is often considered as a maximally efficient one when it provides all the needed communication services in such a way that the use of the protocol requires only minimal amount of hardware and network resources in the end system. The needed communication services typically cover the essential functionalities according to a requested Quality of Service (QoS) level. QoS represents the desired performance properties of a network service generally including throughput, delay, and priority levels for data transfer.

The communication services provided by the protocols in existing general-purpose protocol stacks such as the well-known Open System Interconnection (OSI) reference stack by ISO (International Standardization Organization) with seven layers (physical, data link, network, transport, session, presentation, application) or the closely related TCP/IP (Transmission Control Protocol /Internet Protocol) reference stack are not always adequate for all specific purposes the one may come up with. See reference [1] for further information about the above protocols. In order for a protocol to provide the necessary services and at the same time, place only minimal requirements for available hardware and network resources, the protocol has to be designed according to some specific requirements.

The user of a protocol may be e.g. a lower or higher level protocol or an application. Services provided by the protocol may be accessed via service primitives that define the format and content of the exchanged information. Primitives that are exchanged through Service Access Points (SAP) between successive protocol layers (or between equivalent protocol layers located in different systems) may include user originated data, control and management parameters. The primitives can be divided into four basic classes: requests, indications, responses, and confirmations. Typically a higher layer protocol entity requests some service from a lower layer protocol, receives indication about events from lower layer protocols, and responds to events taken by the lower layer protocol, whereas the lower layer protocol may confirm the events requested by the upper layer protocol.

Protocol functionalities required by the services are realized with data processing, control and management functions respectively. Control functions, e.g. flow, queue, and timing functions, are used to control the data flow through the protocol, for example. Data processing functions, e.g. encryption, error detection, error correction, and fragmentation, manipulate the data itself instead. Management functions like management information base (MIB) functions are associated with monitoring, network level control, power management, protocol state etc.

The control and data functions can be considered as a sequential set of operations, which are executed upon data flow through the protocol. In addition to processing data, each operation can among others branch, buffer, and synchronize data flow. On the contrary, the management functions can be viewed as a set of operations performed substantially in parallel with both control and data functions.

As described hereinbefore, a protocol implementation has a certain structure defining relations between the protocol functions. The structure fixes the consistence of the data flow and defines the composition of control, data, and management functions.

A common problem with contemporary protocol arrangements, however, arises from the evident staticity of the protocol structures tailored for some specific use. Such protocols may be effective from the user's perspective if any modifications or additions are not needed thereto but in case of change in the desired requirements the protocol may have to be at least partly if not completely re-implemented with a renewed hardware and/or software structure.

Publication [2] discloses a design concept of a generic protocol stack for an adaptive terminal. As in mobile networks the features of both UMTS/GSM mobile system and the DECT (Digital Enhanced Cordless Telecommunications) cordless phone system might seem advantageous, the adaptive terminal should incorporate a protocol stack supporting all these systems with some shared resources. Therefore, a protocol stack-skeleton is built upon which the system specific parts are then adapted to. The publication concentrates on finding similarities between GSM, UMTS, and DECT systems from which DECT and UMTS seem to match each other reasonably well in contrast to the older GSM system that has a slightly differing structure what comes to the overall layer division.

Publication [3] discloses a protocol and a protocol framework comprising a generic model of protocol processing, a metaheader protocol supporting per-packet configuration of protocol function, and a set of protocol functions. Protocol functions are not layered and thus they do not attach headers (or extract them) to data units; header attach/detach is performed by the generic model that defines the interface between the actual protocol infrastructure and functions thereof. Metaheader protocol implements multiplexing and composition mechanisms and contains information both for retrieving state information of the incoming data unit efficiently and for indicating which set of protocol functions should be applied to the incoming data unit and possibly in what order they should be utilized. Protocol configurations can be dynamically altered via metaheaders that all data units carry. Configurability is carried out on a plurality of levels: global configuration, connection based configuration (defined at connection start-up by both ends of the communication), and message specific configuration. Moreover, protocol functions are divided into three classes: generic, functions affecting the metaheaders, and functions affecting the internal protocol structure but not appearing in the metaheaders (like data flow control).

Notwithstanding the aforementioned improvements in protocol planning a number of defects are still left more or less intact. In general sense, the prior art methods can be classified as follows: in the first method being the most obvious one a preferred protocol stack may be selected from several permanently fixed complete stacks. This approach causes a multiplicity of overhead originated from the duplication of similar functions included in different stacks and the inclusion of unnecessary functionalities in the end result. The second method solves the problem by offering various partial protocols used to compose application specific complete stacks. In this method the configuration does not modify the functionality of a single partial protocol that is already fixed and used as is [2]. This method includes less overhead than the first method, but there is still functional duplication or unnecessary functionality that cannot be avoided. The most flexible method provides atomic protocol functions composing the dynamic structure [3]. The problems not addressed by this method are related, for example, to the scheduling of protocol processing and management of the protocol in efficient manner.

SUMMARY OF THE INVENTION

The object of the present invention is to alleviate aforesaid defects of contemporary protocol arrangements. The object is achieved by introducing a concept of a configurable protocol engine (CPE) that supports both dynamic boot-time and run-time protocol change schemes wit automated management of the protocol structure. The CPE is a framework for dynamically creating protocols from general-purpose protocol functions according to given requirements. Furthermore, as disclosed by FIG. 1 the protocol assembly 110 is done in order to meet the requirements set by the protocol services 102 and desired QoS 104, and at the same time, by taking the limitations in the hardware 106 and network resources 108 into account. After the protocol assembly, the configured CPE 112 is utilized in the communication process as a normal communication protocol. Reconfiguration of the CPE is done to adapt the protocol engine to changes in e.g. the required services and available resources. Network elements or terminals utilizing the CPE can negotiate or agree in each separate case on the used protocol structure.

Figure 2:
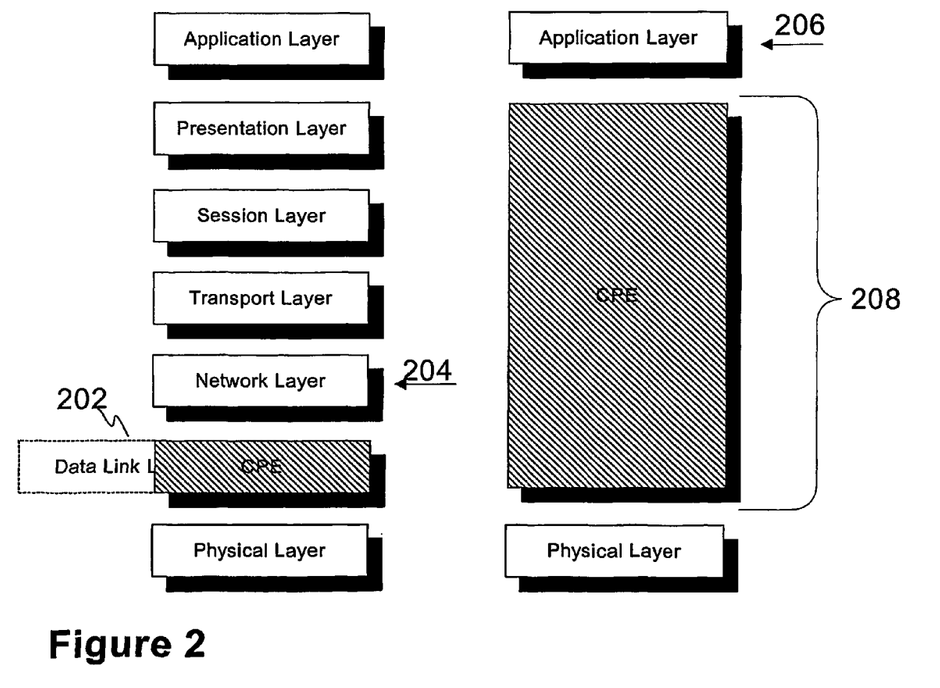
FIG. 2 illustrates the CPE's usability in relation to the common OSI model.

The utility of the invention is based on a variety of issues. The CPE offers a clear function-based method to compose the preferred protocol. The CPE supports dynamic re-configuration based on e.g. service requirements, platform, and networking environment via its configuration manager, and it's flexible and capable of implementing entirely new special purpose protocols as well as parts of already existing protocols with only necessary properties embedded. The user can add functions and interfaces to the CPE libraries, which can be then included in the implemented protocol by modifying the configuration. A protocol stack may be implemented as a whole or in respect to the preferred portions only. With reference to FIG. 2 disclosing two examples, the CPE can be used to realize e.g. one or more protocol layers of the OSI reference model. In the first case, reference sign 202 points to the data link layer implemented with the CPE the user of which is then the network layer 204. In the second example the CPE carries out the functions of five different layers, see reference sign 208, namely presentation, session, transport, network and data link layer. The CPE protocol user is thus the topmost application layer 206. An application or a part thereof may directly utilize the functionalities provided by the CPE. E.g. various data processing methods like data partitioning, coding, and encryption previously included in the application may be embedded to and performed by the CPE. Execution of the methods may be dynamic and depend on the current network conditions, for example, and that way repositioning such methods to a lower layer reduces the processing latency due to a lower proximity to the physical interface in addition to obvious savings in the application memory and processing costs. Furthermore, functions are reused and thus time and effort are saved if compared to the scenario wherein everything is developed from the scratch. Still further, the service primitives can be effectively scheduled by utilizing the CPE scheduling algorithm. The accomplished re-use of basic building blocks like functions for a plurality of purposes. in the constructed protocol obviously saves also memory space in the executing device.

The CPE may be used in both mobile and fixed networks by various network elements like servers, computers or by personal terminal devices such as (multimode) mobile terminals, communication enabled PDAs (Personal Digital Assistant), and other wireless communication devices. Obvious applications include e.g. video, sound, and other data transmission related services over both packet-switched and circuit-switched connections.

Protocol engine configuration is substantially a two-step process. First, the configuration information is delivered to the protocol engine in a readable form, e.g. as a configuration message including configuration parameters. The information may relate to required protocol services, desired QoS, resources of the end system and the used network etc. Then, the received information is used for assembling a suitable protocol meeting the requirements. Protocol services that are typically needed include e.g.

error detection for detecting transmission errors in transferred data,
  error control for controlling and preventing transmission errors,
  corruption control for handling corrupted data packets,
  data retransmission for enabling retransmission of corrupted/lost data packets,
  packet replication control for detecting replicated data packets,
  encryption/decryption for encrypting/decrypting data,
  ordered delivery of data for ensuring the correct ordering of data packets sent/received, and
  flow control for preventing buffer overflow situations.

Figure 3:
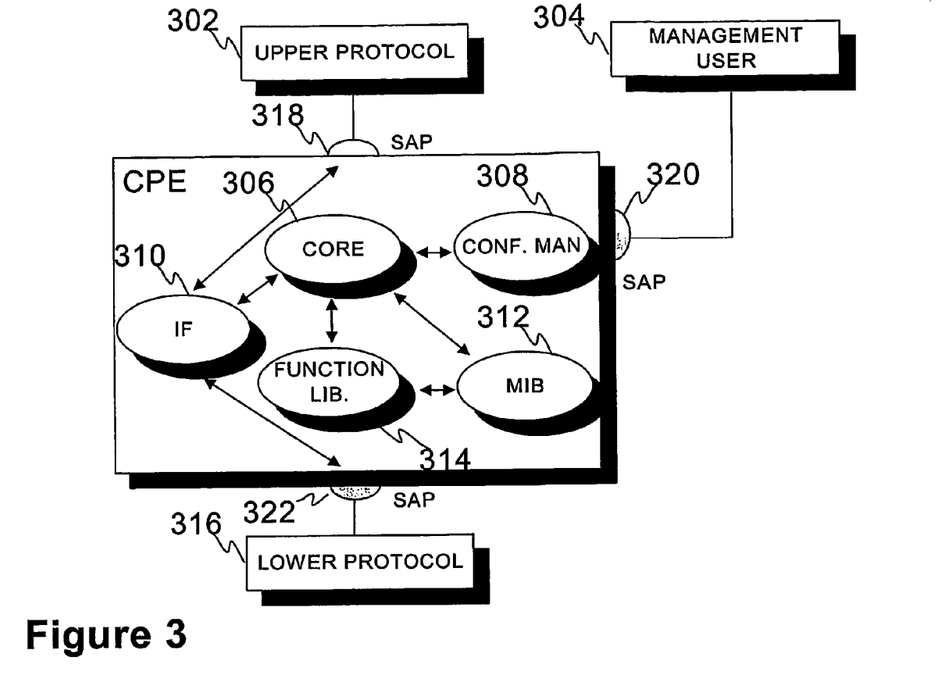
FIG. 3 depicts the CPE internals.

Referring to FIG. 3, the CPE internal architecture is illustrated. Arrows depict communication between different elements. The CPE includes a configuration manager 308, general configurable core 306 and specific libraries of protocol functions 314 and interfaces 310. The configuration manager 308 produces the protocol structure. The core module 306 is protocol independent, and can thus be used for constructing different types of protocol architectures. The libraries 310, 314 include functions for data processing and interfaces providing protocol services to adjacent protocol layers. Communication with the CPE takes place through three different SAPs (see the legends and reference signs 318, 320, 322 in the figure). Two of the SAPs 318, 322 are used for exchanging data between the CPE and the upper 302 (CPE user) and lower 316 protocol layer. The third SAP 320 is used for delivering configuration information for the CPE. In this sketch, a separate management user 304 delivers the configuration information but in practise the actual CPE user may provide that information as well. In addition, the management SAP 320 may be physically attached to the data SAP 318 (e.g. a shared physical interface), albeit the logical separation between those still holds true. MIB 312 stores the current configuration data and can be used for storing management statistics and other information. In addition to mere configuration information, also different service primitives are exchanged through the SAPs. In the CPE architecture, interfaces 310 handle the data delivery between the SAPs and the controlling core 306 of the CPE. The configuration information shall case-specifically specify which interfaces are needed in the protocol assembly in question.

The core 306 forms the kernel of each protocol. Viewed at the highest level it schedules the overall protocol processing. The core 306 receives various protocol service primitives from the interfaces 310 and stores them to queues. The CPE scheduling algorithm then chooses primitives from the queues according to predefined criteria and calls necessary protocol functions depending on the current configuration.

The outgoing primitives are sent from the core 306 back to adjacent protocol layers through the interfaces 310.

The configuration and construction of the CPE is done according to different requirements by the configuration manager 308. Sources of requirements can be e.g. platform capabilities, networking environment, and data transfer quality of service. Platform capabilities are the available functions 314. The functions 314 can be in the form of software that is executed on general hardware or function on some dedicated hardware. The functions 314 are associated with information about their effect on processing requirements, such as processing delay, data throughput, and memory allocations.

The networking environment defines the technologies used for transferring data between network nodes. Basically, the requirement for CPE is to achieve adequate compatibility with peer nodes. The networking technologies, such as compatibility with different network standards in the case of multimode terminal, are thus not limited.

Data transfer quality of a service is associated with the requirements placed by a protocol user for the received data transfer performance. These parameters are used together with platform capabilities for constructing a protocol that best meets the requirements.

For configurability, the core 306 includes a convertible CPE protocol processing scheduler and flexible queuing capabilities. Configuration provided to the core 306 defines the general protocol structure, the used CPE scheduling algorithm and primitive queues for the services.

The core 306 itself is independent of the source that generates the configuration. The configuration can be permanently user defined when implementing a static protocol with CPE, or the configuration manager 308 can dynamically generate it.

According to the invention, a configurable protocol engine (CPE) for configuring and constructing a communication protocol comprises
 means for receiving service primitives,
 means for receiving configuration information,
 means for managing the CPE configuration on the basis of the configuration information,
 means for controlling and scheduling at least part of internal processing in the CPE on the basis of the CPE configuration,
 means for interfacing an upper and lower protocol layer on the basis of the CPE configuration, and
 a number of functions for processing data in accordance with the CPE configuration.

The means for interfacing refer to software and/or hardware means depending on the case. If the CPE is implemented as pure software, such means are of software (code) nature and thus somewhat easily configurable, that, however, may be at least functionally connected to the hardware means (and may at least partially control them) if the CPE is used to implement the layer directly above the physical one. Alternatively, if the CPE implementation has actual hardware parts embedded to take care of interfacing, e.g. in a form of transceiver or physical network adapter controllable by the CPE, such means may be considered as hardware as well.

In another aspect of the invention, a method for configuring a configurable protocol engine (CPE) in order to construct a communication protocol has the steps of
 obtaining configuration information,
 defining the CPE configuration on the basis of said configuration information, and
 adapting the CPE to the defined CPE configuration, whereby at least one action is performed, said action selected from the group of: an interface towards an external entity is implemented, a queue for a service primitive is implemented, and a function to be used for processing data included in a service primitive is determined.

The implementation of a queue refers to at least defining (and maintaining) the association of a certain primitive type (or some other factor common to a number of primitives) with the queue. The queue may not have to be physically realized though by allocating memory space etc before a first primitive of that type really enters the CPE and needs to be stored in a queue.

The function determination in the above aspect refers to either selecting a certain function from a plurality of available functions on the basis of the CPE configuration, or to receiving a (new) function, for example, as a binary code or some less complete indication thereof (information like a number of parameters to cultivate an existing function, or a direct reference to an existing function) from an external entity, in the latter case the function determination being substantially included in the received configuration information.

In a further aspect of the invention, a computer program for implementing at least part of a configurable protocol engine (CPE) for constructing a protocol comprises code means
 to define and manage the CPE configuration on the basis of available configuration information,
 to schedule processing of received service primitives on the basis of the CPE configuration, and
 to provide a number of functions for processing data included in the service primitives in accordance with the CPE configuration.

Still in a further aspect of the invention, an electronic device for implementing a configurable protocol engine (CPE) capable of receiving and processing service primitives comprises processing and memory means for processing and storing instructions and data, and data transfer means for transferring data, said device arranged to receive configuration information, to manage the CPE configuration on the basis of the configuration information, to schedule at least part of the internal processing within the CPE on the basis of the CPE configuration, and to process received service primitives in accordance with the CPE configuration.

The term "engine" refers generally to a general-purpose core, which is responsible for implementing the main functionality. Similarly a "protocol engine" can be considered as a general core part of a communication protocol that implements at least most of the communication between the internal parts. A protocol engine can thus be used as implementation of protocols. A protocol implemented with a protocol engine can be seen from the upper and lower layers as a normal protocol. It may have the upper and lower layer interfaces and also a virtual peer interface. A protocol engine may implement a single protocol layer, a whole stack, or just part of the stack. A configurable protocol engine is able to implement different communication protocols by utilizing a number of general-purpose functions.

In an embodiment of the invention, one option for utilizing the CPE concept in protocol design is presented. Configuration information, protocol assembly and protocol runtime execution are discussed in detail. The constructed protocol may be used in, for example, transferring video data with different levels of protection/encryption depending on the connection type and other parameters.

Dependent claims disclose embodiments of the invention.

BRIEF DESCRIPTION OF THE DRAWINGS

Hereinafter the invention is described in more detail by reference to the attached drawings, wherein FIG. 1 discloses the CPE configuration process on a general level.

DETAILED DESCRIPTION OF THE EMBODIMENT OF THE INVENTION

Figure 1:
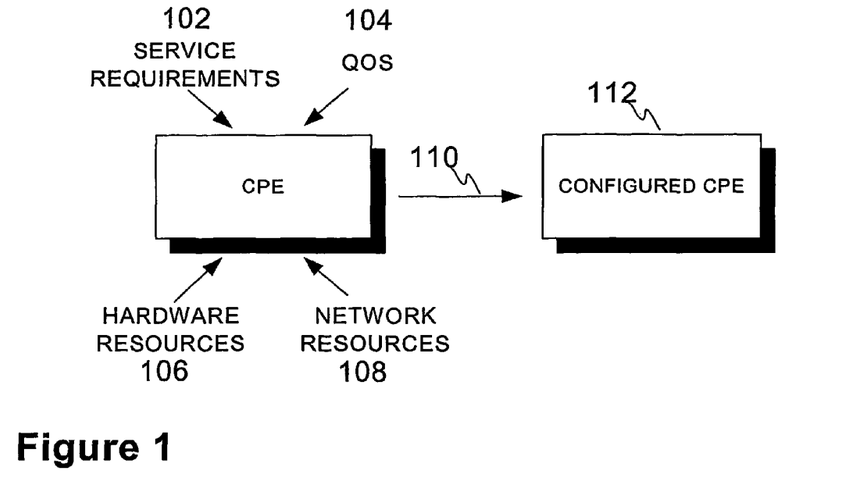

FIGS. 1-3 were already discussed in conjunction with the description of the summary of the invention.

Figure 4:
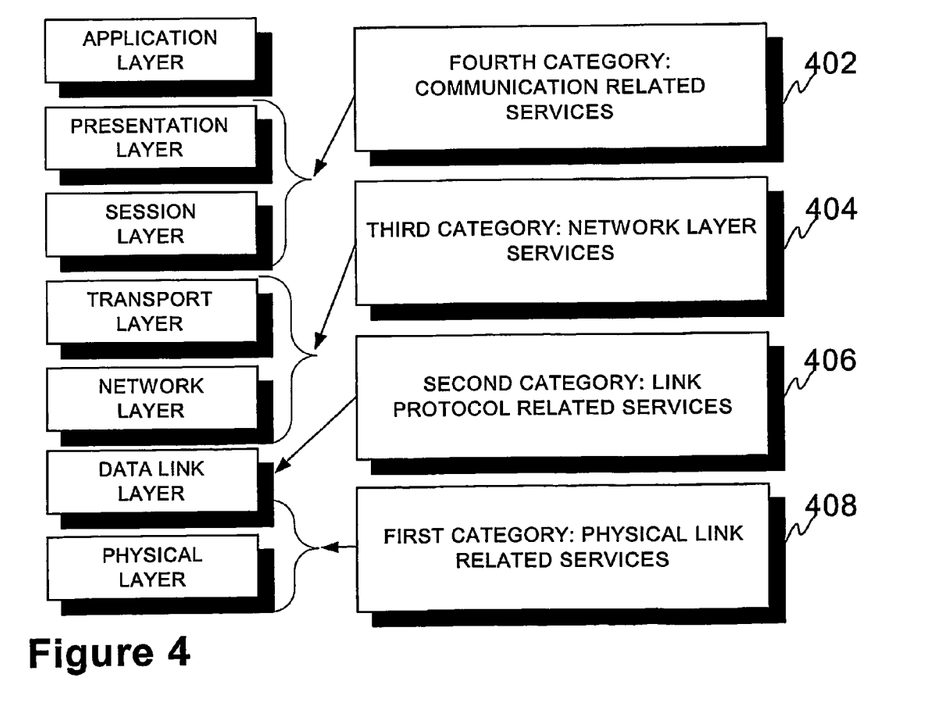
FIG. 4 discloses one option for protocol service categorization by utilizing the OSI model.

FIG. 4 discloses, by way of example only, how typical protocol services may be categorized in relation to the OSI reference model. The protocol functions each of which realizes a simple protocol task are stored in the CPE function library. Whenever the CPE must be capable of providing protocol services that cover the most common services offered by the layers from 2 to 6 in the OSI model, the function library must include several protocol functions to carry out such services. Generally speaking, the protocol services can be divided into four categories according to which layer they are normally provided on.

The first category 408 of services is related to physical link services including link management and frame control. Also error detection services, radio management, and power save management are included in this category.

The second category 406, link protocol related services, includes data segmentation and reassembly services. Also flow control and error control services are present. The services in the second category 406 are normally provided by the upper part of the data link layer.

Network layer services form the third category 404. These are congestion control and routing related services. Also seg-mentation and flow control, as well as error control services are included. In the OSI reference model, such services are provided on the network and transport layers.

The fourth category 402, communication service related services, includes services concerning session management, data presentation, and data compression. These services are related to the session and presentation layers of the OSI model.

The protocol functions may then be selected to the CPE functions library by utilizing the knowledge about the most common services supported by communication protocols. Such functions may include
 parity bit calculation for calculating parity bit for the sent/received data,
 cyclic Redundancy Check (CRC) for calculating checksum for data using CRC,
 forward Error Correction (FEC) for implementing FEC as an error control method,
 automatic Repeat Request (ARQ) for implementing ARQ of damaged or lost packets,
 data retransmission for retransmitting data when requested,
 packet replication check for checking packet duplicates in case of packet replication,
 data encryption standard (DES) for encrypting/decrypting data,
 data re-sequencing for sequencing the data packets in the right order in case of unordered arrival of packets,
 data acknowledgement function for acknowledging the received data,
 sequence numbering for adding sequence number for data packets interpreting them at the receiving end,
 data segmentation for segmenting data packets to smaller packets/frames if needed,
 data reassembly for reassembling the segmented data, and
 power save for ordering the CPE utilizing device to go into power save mode on idle periods.

Figure 5:
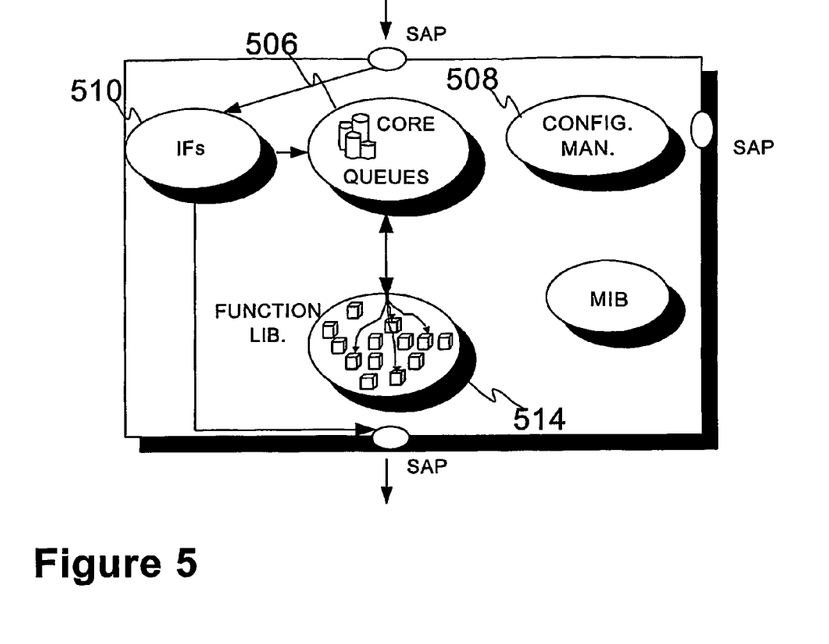
FIG. 5 depicts data flow inside the CPE upon receiving and processing data.

Next, the CPE top-level elements are described in more detail by referring first to FIG. 5 disclosing data flow through the CPE between the upper and lower protocol layers. In the figure, only a single scenario wherein data (~service primitive) is received from the upper layer to be processed and finally delivered to the lower layer is illustrated with arrows for simplicity reasons. Configuration management 508 is described later in the text. When data arrives from the upper (or the lower) protocol layer, it passes through the instantiated CPE interface(s) 510 and enters the CPE core 506. Therein the data is placed into a data queue according to the priority of the data. Next, the data is retrieved from the queue and delivered to a protocol function 514 where it is processed. The core 506 handles the internal data traffic between the data queues and protocol functions 514, and the data is passed through a series of instantiated (filled in the figure) protocol functions 514 in a certain order. When the data arrives to a protocol function 514, the function processes the data and returns it back to the CPE core 506 that sends the data to the next protocol function 514. If the next protocol function 514 is busy handling other data, the data is stored to the data queues to be processed when the function 514 is available again. After the data has passed through all the needed protocol functions 514, it is placed into the outgoing data queue, from where it is sent to upper/lower protocol layer through an appropriate CPE interface 510 and SAP.

Figure 6:
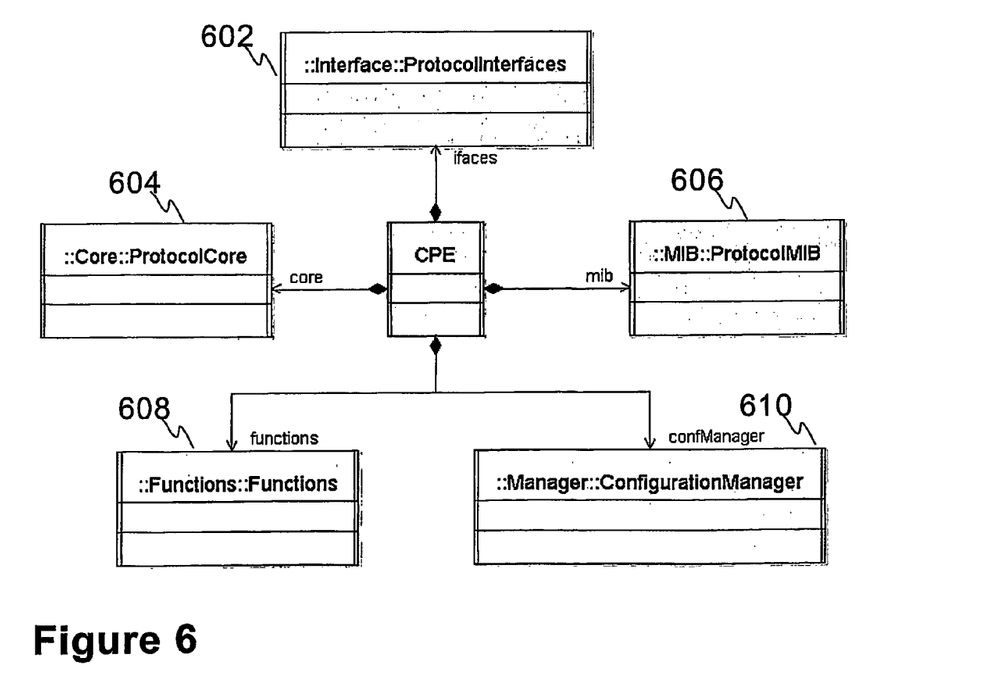
FIG. 6 is a CPE UML class diagram.

A UML (Unified Modeling Language) class diagram of the CPE is presented in FIG. 6 with relevant associations and compositions marked. As UML is nowadays a standard tool for describing software systems the average person skilled in the art is ought to be familiar with it. However, further information about the UML notation is available at the OMG (Object Management Group) homepage on the Internet [4] if needed. The CPE includes ProtocolInterfaces 602, ProtocolCore 604, ProtocolMIB 606, Functions 608, and ConfigurationManager 610 top-level classes, of which ProtocolInterfaces 602, Functions 608, and ProtocolMIB 606 classes must be realised according to the implemented protocol.

Figure 7:
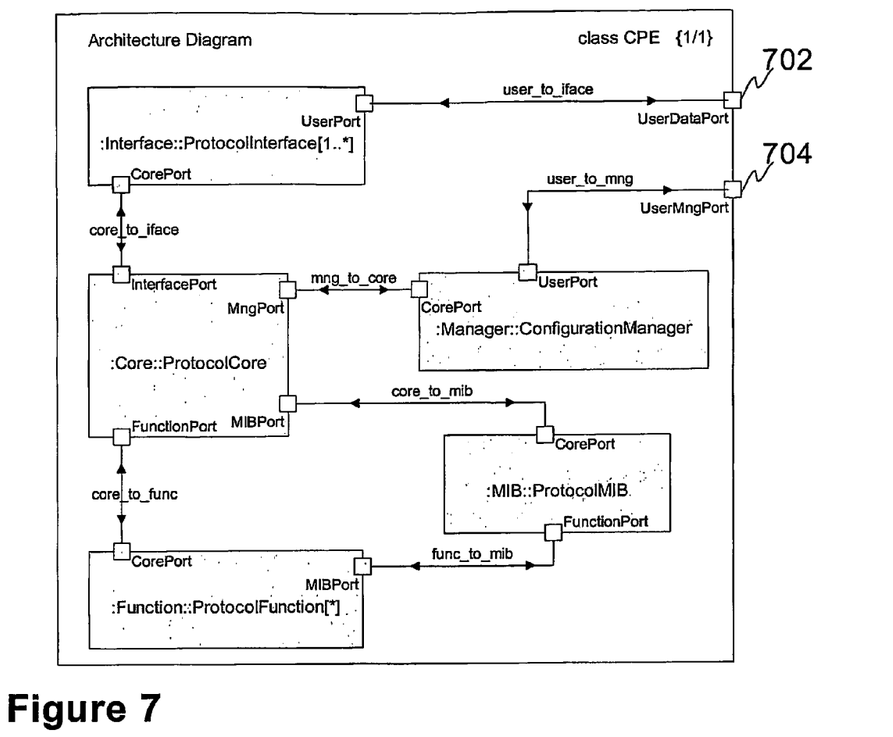
FIG. 7 is a CPE UML architecture diagram.

Correspondingly, a UML architecture diagram of the CPE is presented in FIG. 7. The CPE communicates with the environment through two ports. The user data port 702 (UserDataPort) is used by upper and lower layer protocol users. Both of these entities use data and management services of the particular protocol. The other port, management port 704 (UserMngPort) is used by the management user who configures and manages the CPE itself. The Core of CPE includes great majority of the CPE functionality, and is thus described in more detail below.

The controlling core is the nerve centre of the CPE. It contains most of the CPE functionality since it controls the execution of the assembled protocol and is responsible for reconfiguring the CPE in case of changes in the service requirements or in available resources. The core contains data queues for different priority class data and is responsible for initializing the data queues according to the configuration information. The core also handles the initialization of all internal processes, functions, and interfaces.

Figure 8:
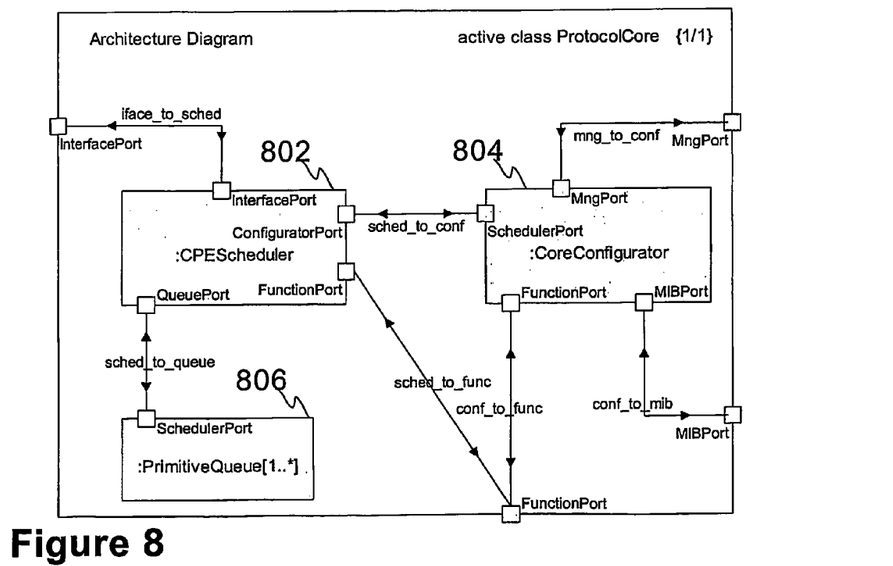
FIG. 8 is a CPE core UML architecture diagram.

The core is divided into three sub-classes as depicted in the UML architecture diagram of FIG. 8. The Core configurator 804 is responsible for applying the CPE configuration, and it is controlled by the configuration manager through the management port. The configurator block 804 distributes the current configuration to other blocks by, for example, responding to the configuration inquiries. The CPE scheduler 802 schedules the processing of the primitives received from the interfaces and stores waiting primitives to the primitive queues 810. Data is then retrieved from the queues 806 at a right moment in accordance with e.g. the priority levels of data, and delivered to a proper protocol function. Finally, the core returns the processed data to the queues of outgoing data and from there to the CPE interfaces.

Figure 9:
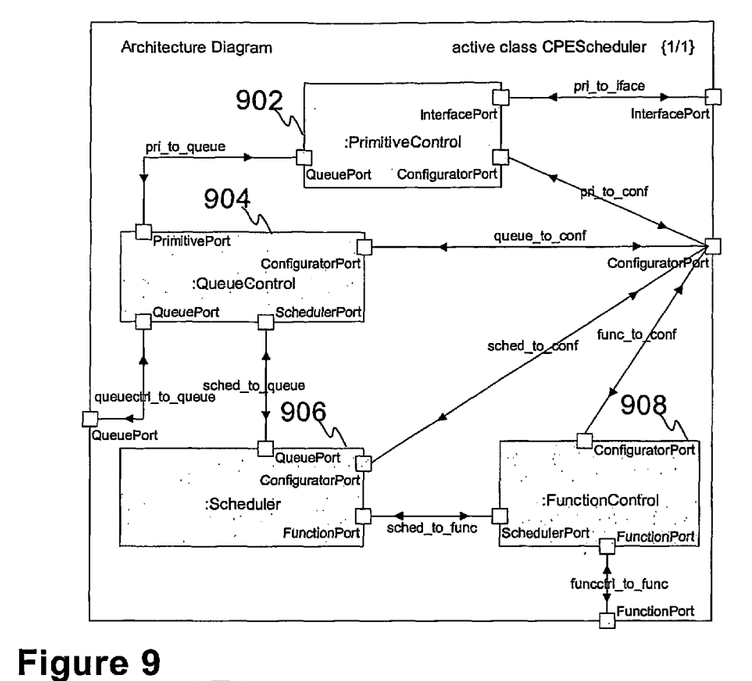
FIG. 9 is a UML architecture diagram of the CPE scheduler.

Internal architecture of the CPE scheduler is presented in the architecture diagram of FIG. 9. In addition to the scheduler sub-block 906 corresponding to the scheduler class, the CPE scheduler includes also three control sub-blocks, PrimitiveControl 902, QueueControl 904, and FunctionControl 908, to control communication with external blocks. The primitiveControl 902 receives primitives from the interfaces and forwards them to proper queues according to the priority thereof (indicated by the primitive), and vice versa. The QueueControl 904 handles the queues it contains (for example, instantiation and termination of Queue objects) and provides queue services to other blocks. The scheduler 906 sub-block selects primitives from the queues according to the scheduler algorithm that utilizes queue priorities and forwards primitives to the functions via the FunctionControl 908. The FunctionControl 908 handles function calls from the Scheduler 906 and forwards processed primitives back to the queues through the scheduler 906. A certain primitive may be delivered to a plurality of functions one at a time. The association between a certain primitive and a certain group of functions is specified in the FunctionControl 908 class as well as the proper order for their execution. Whenever a primitive is targeted to a function already in use, the primitive is returned back to the queue until the function becomes available again.

Considering the data flow during the scheduling phase, the CPE core receives primitives from the interfaces and they are stored in the queues with the help of primitive controller 902. There are separate queues 904 for different primitive types, which allows prioritising. When the CPE scheduler 906 is activated to process the primitives, the CPE scheduler algorithm selects the next queue to process. A primitive is received from the selected queue and the function controller 908 resolves the next function in the primitive processing sequence and calls the function. When the function (or a plurality of required functions respectively) finishes the processing, the primitive is stored back to the queue 904.

The CPE is configured through a configuration manager as mentioned before. The configuration manager is in this particular embodiment used only for the configuration and reconfiguration of the CPE thus its main responsibilities include, for example, reception of the configuration information from the CPE management user. The configuration manager analyses the configuration information and formulates necessary instructions for the CPE core about which functions need to be instantiated, which interfaces are required, and what kind of data queues have to be established. Information about the current configuration is stored in the MIB. This includes the information about the protocol functions included in the protocol assembly and the information about the available hardware and network resources. The information stored in the MIB is used at least by the CPE core.

The configuration information consists of several different elements: required protocol services and a required service level for each service, available hardware resources, parameters concerning the characteristics of the used network, information about the upper and lower protocol layers between which the CPE resides, and also about the desired QoS, which in the CPE refers to e.g. a number of data priority levels needed.

The protocol services required by the CPE user are listed in the configuration information. The list consists of one or more protocol services available in CPE. The protocol services can be offered by using a suitable set of CPE protocol functions introduced hereinbefore, for example. The required minimum service level (Qmin) for each service can be announced as an integer value from 1 to 5.

Information about the available hardware resources can be specified by various parameters as well: available physical memory, available processor power, and the battery power level in the physical device etc.

Also different parameters concerning the characteristics of the used network shall be defined: the available network bandwidth, Bit Error Rate (BER), the Maximum Transfer Unit (MTU) size, jitter for packet transfer in the network, and information about the used transfer medium. The last parameter can be used to advertise whether the network is wireless or wired.

Information about the surrounding protocol layers is stated in the configuration information with e.g. two parameters: the upper protocol layer and the lower protocol layer announcing the corresponding protocol layers in the OSI model.

QoS is supported in the CPE data delivery by, for example, dividing data into different priority classes. The last parameter in the configuration information states the number of desired priority levels for data.

One feasible option for the CPE configuration information is summarized in the following table 1. Value ranges and used units of the configuration parameters are also presented.

TABLE 1

| Information Element | Description |
| --- | --- |
| List of required services and a required minimum service level for each service | The required protocol services presented as a list. The available protocol services are: Error detection<br>Error control<br>Corruption control<br>Data retransmission<br>Packet replication control<br>Encryption & decryption<br>Ordered delivery of data<br>Flow control. |
| Available hardware resources | Parameters describing the available hardware resources in the end system:<br>Processor power (integer value > 0, Million Instructions Per Second, MIPS)<br>Physical memory (integer value > 0, KB) |
| Network characteristics | Parameters describing the characteristics of the used network:<br>Network bandwidth (integer value > 0, Kb/s)<br>BER (real value > 0, no units)<br>MTU (integer value > 0, octets) |
| Surrounding protocol layers | Numbers representing the corresponding OSI layers for the protocol layers above and below CPE.<br>Upper protocol layer (integer value 3-7, no units) |
| QoS | Desired QoS is expressed as a number defining the desired priority level.<br>Priority levels (integer value 1-10, no units) |

As seen from the above table, in this case the QoS and the associated priority level has been expressed as a simple numeric parameter having values between 1 and 10 for simplicity reasons. In practice, numerous QoS algorithms and definitions exist with a plurality of different parameters. Such alternative methods are similarly feasible in providing priority information to the CPE for further utilization. Correspondingly, "Surrounding protocol layers" element may be used for indicating also the used protocol version (IPv4 versus IPv6, for example) and other protocol or protocol layer specific information, not just the layer in which the surrounding protocols are located.

As mentioned earlier, the configuration and reconfiguration of CPE comprises delivering the configuration information to CPE and creating a protocol assembly according to that information. After that, the configured CPE is used for data transfer as a normal protocol.

After specifying the configuration information and delivering it to CPE the available hardware resources and the parameters concerning the used network are analyzed and maximum values for e.g. three cost factors are set. The cost factors are numerical values that present the relative influence on the load that the created protocol assembly puts on the available hardware resources and on the used network.

The three cost factors are defined for each function as follows: D for overhead traffic, P for processor power, and M for memory. All of those are described as an integer value from 1 to 10, with 1 corresponding to the lowest relative influence.

The factor D describes the relative amount of overhead traffic that is generated by the function in question. For example, data acknowledgement function generates overhead traffic by sending acknowledgement messages.

The factor P describes the relative level of processor power needed for executing the function. For example, encryption function puts relatively high load on the processor where as, for example, the execution of a parity bit calculation function requires less processor power.

The M factor describes the relative amount of physical memory needed if the function is included in the protocol assembly. For example, data retransmission function requires some kind of data buffering ability and that requires relatively high amount of physical memory.

In addition to the cost factors, a Q-value is defined for each function. It specifies the level of service the function is capable of providing. For example, an error detection service can be provided with a parity bit calculation function or with a CRC (Cyclic Redundancy Check) function. With CRC, more errors can be detected from the received data. Therefore the CRC function has a higher Q-value than the parity bit calculation function.

Each function contains e.g. six different parameters: name, three cost factors M, P, and D, the level of service Q, and finally the function dependencies specifying the other functions required in the protocol assembly with the one in question.

The selection of functions to implement the required services is done in the following manner for each of the services: The Qmin value of the service is compared to Q-value (Qi) of the functions capable of providing the service. Next, the cost factor values (Di, Pi, Mi) of the functions having $$Qi \geq Qmin \quad (1)$$

are compared to the maximum values for the three cost factors (Dmax, Pmax, Mmax), which describe the limit that should not be exceeded by any protocol function that is included in the created protocol assembly. The comparison is done by calculating the total difference $$Ti = Dmax - Di + Pmax - Pi + Mmax - Mi \quad (2)$$

for the protocol functions satisfying (1). The function having the highest Ti is then selected to be included in the assembly. If the selected function requires also other functions to be included in the assembly to implement the service, the selection of these functions is done in the same manner.

Figure 10:
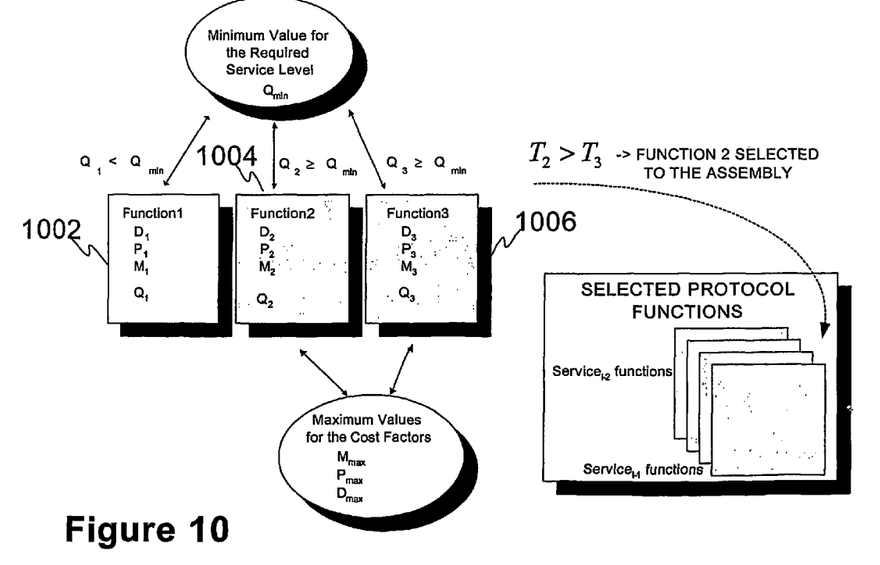
FIG. 10 depicts one option for the function selection process in the CPE.

FIG. 10 illustrates the above function selection process. In this example, a service can be implemented by including one of three functions, Function1 1002, Function2 1004, and Function3 1006, in the protocol assembly. First, levels of service factors (Q) are checked, and the Function1 1002 is dropped as being not able to provide an adequate service level. Then the cost difference (T) according to (2) is calculated on the basis of which function2 1004 is finally selected due to a larger difference.

A list of protocol functions needed to implement all the required services can be formed in the above-described manner. The configuration manager passes the list to the CPE core that instantiates the required protocol functions from the CPE function library. It is noted that also other methods can be applied in the function selection process if found useful. The above solution is only a simplistic example, being however quite feasible if more sophisticated solutions are not necessary.

In addition to the selection and instantiation of protocol functions, the needed interfaces and data queues are initialised. After this, the configuration is ready and CPE can be used for data transfer.

Further reverting to the CPE scheduling algorithm for a moment, as the configuration information defines the required services and the associated QoS values, the CPE scheduler may create a separate queue for each required QoS (priority) value/class, and in the most simple implementation, just handle/serve the various service primitives (or derivatives thereof, e.g. modified primitives with added/deleted data)

placed into the queues by controlling the processing of the queues according to the related QoS value in decreasing order.

Priority as a concept, however, should be interpreted more broadly than just a single QoS parameter that defines a proper queue for a primitive. Instead, priority refers to a general importance of e.g. a service, a service primitive, or a group of services/primitives respectively, and therefore may actually affect the service requirements and service levels including both software and hardware aspects. Thus, a number of different priority factors may exist for a certain service/primitive. Then, for example, part of the priority information may indicate how the data associated with a certain priority should be secured/protected (e.g. channel coding, encryption) in addition to mere latency issues handled by the priority queues.

A need for adjusting the current CPE configuration may arise while using CPE for data transfer. The CPE user may need some additional protocol services or some services are not required any more. Such situation may be caused by the change in the available hardware or network resources, data priority levels or the other protocol layers surrounding the CPE. Because of the changes, a new set of configuration information must be specified. The CPE management user delivers this information to CPE and the (re)configuration is initiated. Before instantiating new protocol functions or interfaces, and creating new data queues based on the new configuration information, CPE is reset using either a soft or hard reset request. After this, the reconfiguration process goes through the same phases as the boot-time configuration of the CPE presented hereinbefore. If only minor changes are needed, a supplementary configuration update message may be specified in order to alter/insert/delete a certain service in the otherwise still applicable existing configuration, for example.

Figure 11:
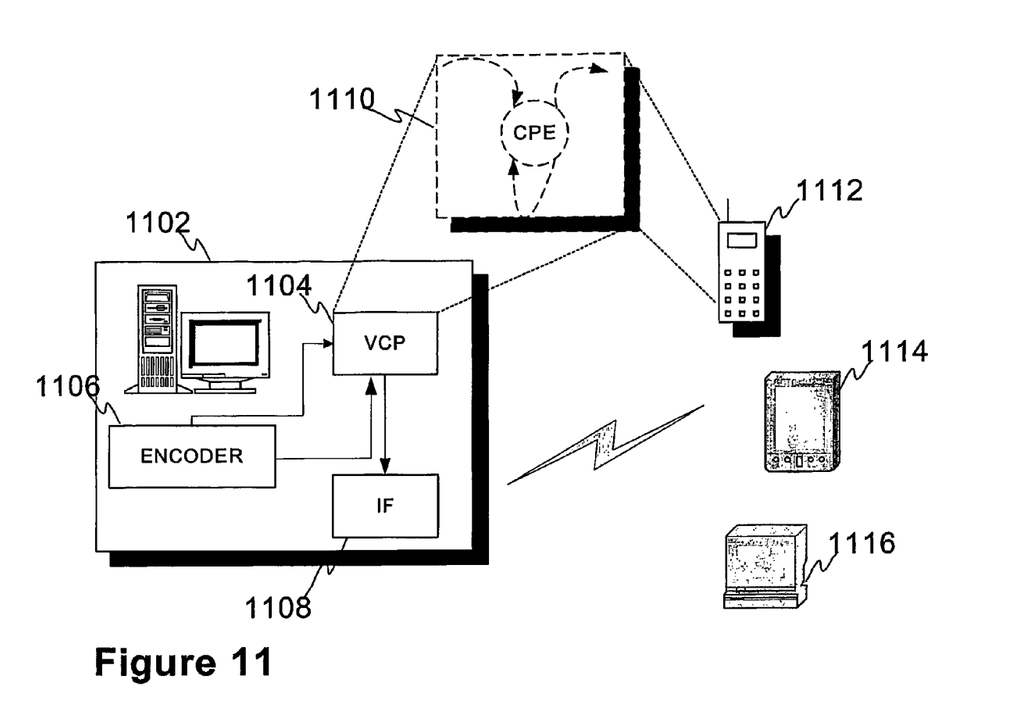
FIG. 11 visualises a video transmission system utilizing the CPE.

As one possible use case of the invention, a sketch of a video transmission system is presented in FIG. 11. Real-time video streaming services are becoming more and more popular and can even be utilized by the modern mobile hand-held devices such as mobile terminals. Therefore, it's not an unusual scenario to occur in which a video server system 1102 encodes 1106 and transmits coded video data to a device that can be located either at the end of some fixed or wireless connection respectively. For example, the case-specific far-end client that can be e.g. a mobile terminal 1112, a PDA/laptop 1114, or a personal (desktop) computer 1116, may bear wireless connectivity means like GSM, WLAN (Wireless Local Area Network) or Bluetooth radio transceiver, or interfacing means for wire transmission like an Ethernet adapter.

Traditionally oriented approach in aforesaid cases for supporting different data transmission techniques in the server system 1102 has been the installation of additional protocols/several parallel protocol stacks and/or a plurality of specific interface cards providing the necessary transmission technique specific transceivers and/or supplementary protocols to the server device. Thereupon, the resulting arrangement has surely not been optimised in relation to memory consumption, configurability, or adaptivity issues etc. For real-time video streaming, a protocol stack that is transparent from the application's viewpoint would be beneficial as the coder could then directly control e.g. retransmissions and bit error protection. As varying channel conditions like noise, fading effects, and congestion, typically cause problems to data transmission; these factors should be taken into account upon transferring video data. Advantageously, e.g. used video coding, ciphering, and protection (channel coding and error concealment, for example) methods should be separately adapted to different connection types even during a connection due to changed channel conditions or some other factor. It's now obvious that the CPE 1110 could be used to construct a transparent adaptive protocol (stack) to overcome the above dynamic scenarios as described hereinbefore. Moreover, the CPE may be configured to take care of functionalities otherwise handled by the application itself. The encoder 1106 can provide the CPE 1110 initial configuration information in order to set up the necessary interfaces, to instantiate proper functions, and to organize the scheduling of different video service primitives with a plurality of queues; the CPE 1110 is acting as a flexible VCP (Video Control Protocol) 1104 from there on. Instead of otherwise inevitably quite complex protocol structure with several vertical (and possibly horizontal) layers a single CPE entity 1110 may be thus configured to provide at least most if not all services/functionalities necessary for reliable, transparent and fast video transmission. This feature is highlighted in the figure by representing the CPE as an object with single input/output arrows and a dotted feedback arrow describing the various internal connections and processing chains. Likewise, the client devices 1112, 1114, and 1116 may utilize the CPE for data (including signalling) reception and transmission, and be that way enabled to connect to a variety of services over different protocol arrangements without redundancy introduced by parallel protocol stacks. Situations may occur in which the server can be fully packed with different partly overlapping software and hardware solutions without problems but the same processing, memory, and maybe even physical space resources (e.g. in small-sized terminals) do not exist in the client side, and the CPE may be used to cut down unnecessary processing and memory usage, for example. The client device may bear a plurality of physical connecting means (multiple or adaptive transceiver arrangements, network adapter) and then utilize the CPE to provide flexibly configurable upper protocol layer(s) for successful service reception.

Thus, the interface 1108 for actual physical (protocol) layer concerning both the server and the client devices can be carried out by the functionalities both in the CPE and in various physical interface adapters, or by embedding necessary hardware means to the CPE module, or just by letting the separate physical interface(s) 1108 to fully take care of the low-level transmission over the physical interface.

Figure 12A:
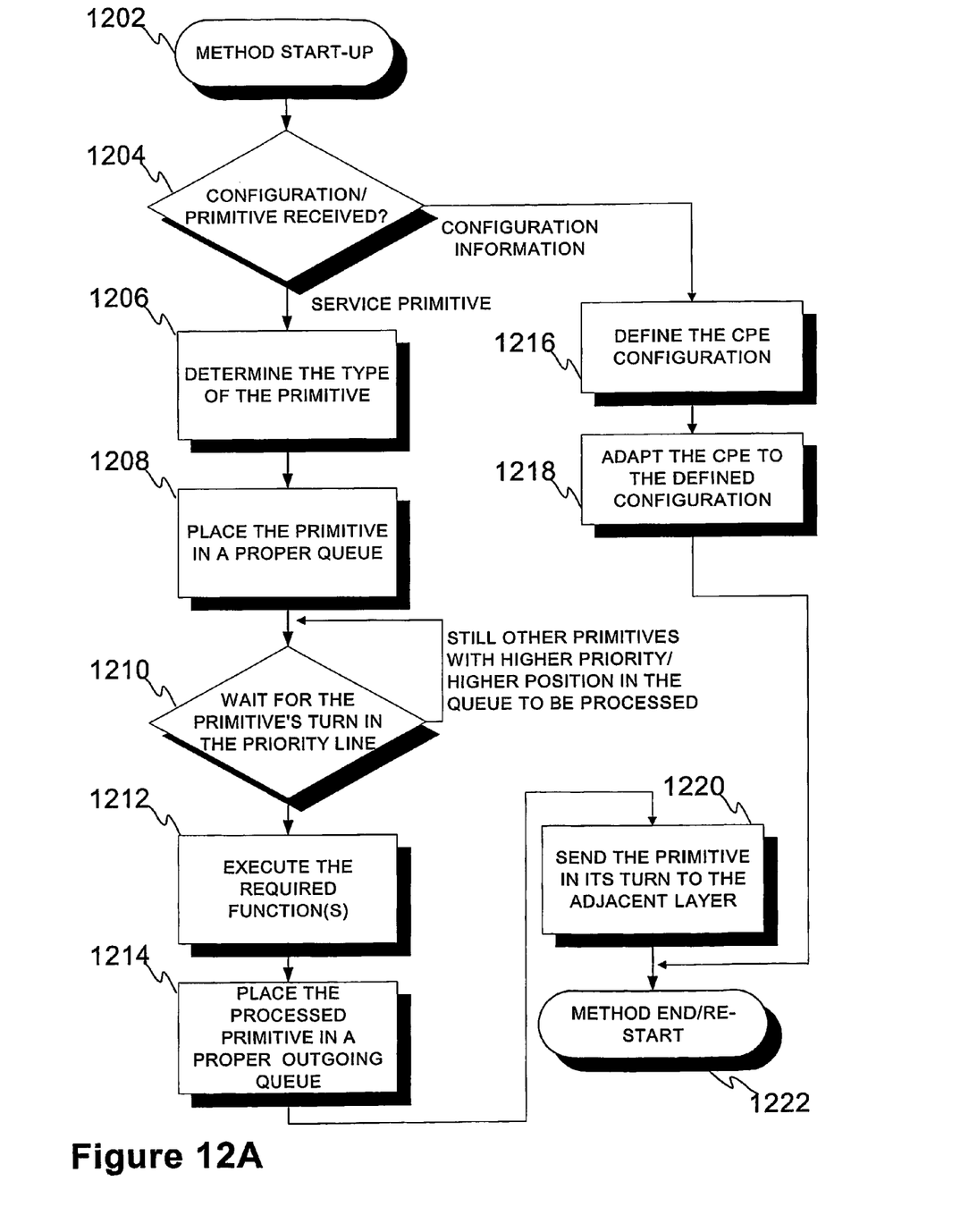
FIG. 12A is flow diagram of the method for constructing and managing a protocol with the CPE.
Figure 12B:
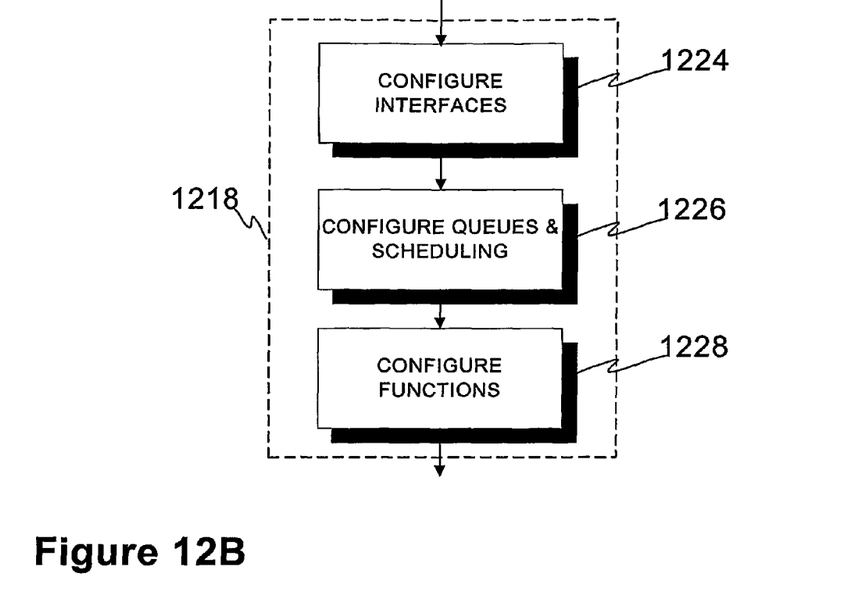
FIG. 12B further discloses the CPE configuration process in more detail.

A method of the invention for configuring and constructing a protocol by utilizing the CPE concept is described with the help of FIGS. 12A and 12B, the former of which disclosing the CPE internal flow diagram upon receiving a service primitive/configuration information and the latter disclosing the few events taken during the CPE configuration process in more detail.

In step 1202, the method execution is ramped-up, e.g. the necessary hardware is configured, related software is loaded to the memory of the executing device, and various parameters are set to their initialisation values. Upon receiving data entity either through the user or management SAP 1204 and corresponding interfaces, a proper execution path is selected. If the incoming data is a standard service primitive, its type is determined in step 1206 meaning the service identifier is extracted from the primitive by the CPE core (primitive control block) in order to place it to a proper queue (handled by the queue control block) that is done in step 1208. The primitive is not processed until the primitives with higher priority (or with equal priority but received earlier thus having a higher position (i.e. primitive at the top to be processed next) in the queue) have been served 1210, this being taken care of by the scheduler algorithm, after which the function control block drives the primitive data through required functions in step 1212. Then the processed data is placed in a proper outgoing queue 1214 to be delivered to the adjacent protocol layer in step 1220. The method is ended or re-started in phase 1222. In case of configuration information that has been defined by the management user and delivered to the CPE, the configuration manager first analyses the information by, for example, calculating the aforesaid cost factors for function selection etc in order to define 1216 the actual CPE configuration. The CPE configuration is taken into use by delivering necessary instructions for instantiating suitable functions and for creating required interfaces and primitive queues to the protocol core 1218. The CPE core then adapts to the newly received configuration.

In FIG. 12B the adaptation phase 1218 is further illustrated via a three-step process: interface configuration 1224, queue/scheduler configuration 1226, and function configuration (~selection) 1228. The execution order of the presented steps is not a critical issue though.

Figure 13:
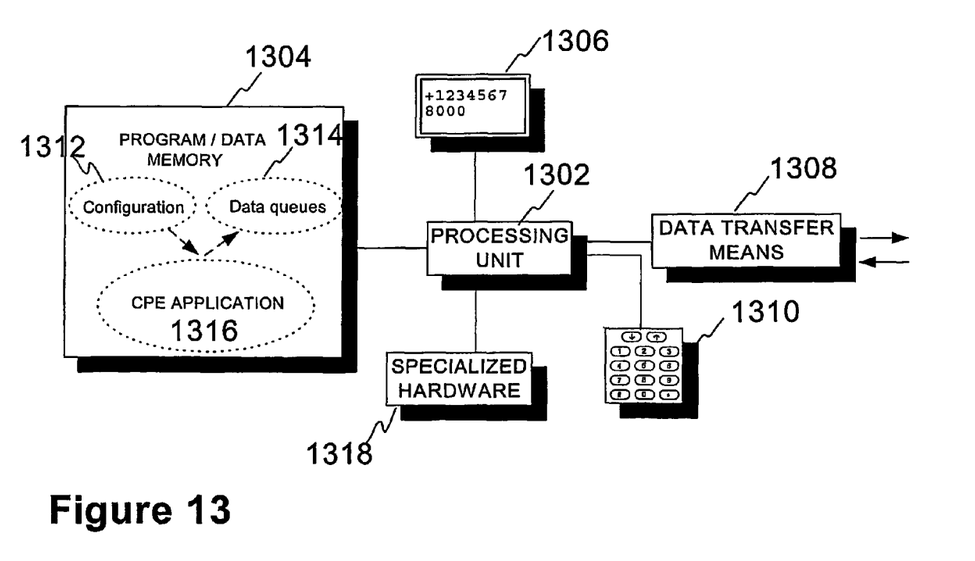
FIG. 13 is a block diagram of a device capable of hosting the CPE.

FIG. 13 depicts basic components of a device like a mobile terminal or a computer capable of processing, storing, and transferring data in accordance with the invention. Memory 1304, comprised of one or more physical memory chips, includes necessary CPE code 1316, e.g. in a form of a computer program/application, and necessary data (and/or necessary free data space) like the CPE configuration 1312 and a number of queues 1314 for the primitives. A processing unit 1302 is required for the actual execution of the code 1316, albeit at least part of the CPE functionality can be carried out with specialized hardware 1318, for example. Display 1306 and keypad 1310 are optional components for providing necessary device control and data visualization means (~user interface) to the users. Data transfer means 1308, e.g. a radio transceiver, a serial/parallel bus, or a network adapter are required for handling actual physical level data (including standard service primitives and configuration information) exchange with other devices. The code 1316 for the execution of the proposed engine can be stored and delivered on a carrier medium like a floppy, a CD or a memory card.

Thus, the CPE may be constructed as software, hardware or a combination of both. Such hardware may include microprocessors, microcontrollers, programmable logic chips and various circuit arrangements. In addition, the CPE can be realized as a separate module that is connected to the existing system. The module may act between different system components or as an intermediate entity between two different systems.

The configuration information acting as a CPE configuration source can be delivered to the CPE manager as presented hereinbefore to be cultivated into an actual (final) CPE configuration by the manager and to be taken into use by the CPE core. However, the CPE configuration can also be explicitly constructed and possibly verified (by utilizing predefined configuration test software that matches the configuration to the specifications determining allowed parameter combinations, for example) by the managing or some other external entity to be only delivered to the CPE for direct utilization without further calculations. Likewise, new functions may be added to the function library by utilizing the network connections. They must, however, follow the general rules defined for admissible functions in the CPE, and either the entity that is about to provide the functions or the CPE engine itself may utilize various self-test programs in order to verify proper composition of the constructed/received functions before transmission/adoption.

The scope of the invention can be found in the following claims. However, utilized devices, method steps, configuration information, protocol internal structure, message and data structures etc may vary depending on the scenario, still converging to the basic ideas of this invention. For example, it is clear that the invention can be utilized in many different systems, not only in connection with the OSI model that was mentioned and used as a starting point for modifications in this text only due to its evident popularity in communication systems in general. Moreover, it is noted that the numeric values and numeric ranges used in the text are only exemplary and surely not the only ones applicable to exploitation in the CPE.

REFERENCES

[1] Peterson Larry L., Davie Bruce S.: Computer Networks: A Systems Approach, 3rd Edition, Morgan Kaufman 2003, ISBN 155860832X
[2] Siebert Matthias: Design of a generic Protocol Stack for an Adaptive Terminal, Karlsruhe Workshop on Software Radios 2000 (http://www.comnets.rwth-aachen.de/publications/alpha.html)
[3] Calvert K. L, Kravets R. H., Krupczak R. D: An extensible End-to-End Protocol and Framework, College of Computing, Georgia Institute of Technology 1995
[4] UML Resource Page on the Internet (http://www.omg.org/uml/), OMG 2003

The invention claimed is:

1. An apparatus, comprising:
a processor configured with a memory that stores program instructions, where execution of the program instructions provides a configurable protocol engine to configure and construct a communication protocol, said processor further configured to receive service primitives and configuration information, and to manage configurable protocol engine configuration on the basis of the configuration information, said processor further configured to control and schedule at least part of internal processing in the configurable protocol engine on the basis of the configurable protocol engine configuration, said processor further configured to interface with at least one of an upper protocol layer and a lower protocol layer on the basis of the configurable protocol engine configuration and to execute functions for processing data in accordance with the configurable protocol engine configuration, where individual ones of the functions are selected for inclusion in the communication protocol on the basis of at least a level of service provided by the function and at least one cost factor related to the function; and
where the configurable protocol engine configuration is constructed on the basis of at least one of service requirements, a required quality of service, hardware resources and network resources.

2. The apparatus of claim 1, where a number of the functions is selected on the basis of the configurable protocol engine configuration from a plurality of functions, said plurality of functions comprising an equal or larger number of functions than the selected number of functions.

3. The apparatus of claim 1, where the configuration information is received and processed during start-up of the configurable protocol engine or at run-time.

4. The apparatus of claim 1, where at least one of said functions is received from an external entity.

5. The apparatus of claim 1, said processor further configured to schedule said received service primitives.

6. The apparatus of claim 1, said processor further configured to perform scheduling by maintaining a plurality of queues for the service primitives, where the queues are serviced on the basis of queue priority and where the service primitives are placed into the queues on the basis of priority.

7. The apparatus of claim 1, wherein the received configuration information explicitly defines the configurable protocol engine configuration.

8. The apparatus of claim 1, wherein the received configuration information is a source for constructing the configurable protocol engine configuration.

9. The apparatus of claim 1, where said configurable protocol engine is implemented in cooperation with hardware other than said processor.

10. A method, comprising:
configuring a configurable protocol engine to construct a communication protocol, where configuring comprises, receiving configuration information,
defining a configurable protocol engine configuration on the basis of the received configuration information, and
adapting the configurable protocol engine to the defined configurable protocol engine configuration such that at least one action is performed,
where the action is comprised of at least one of implementing an interface towards an external entity, implementing a queue for a service primitive, and determining a function to be used for processing data included in a service primitive, where a function is selected for inclusion in the communication protocol on the basis of at least one of a service level provided by the function and at least one cost factor related to the function, and
where the configurable protocol engine configuration is defined on the basis of at least one of service requirements, a required quality of service, hardware resources and network resources.

11. The method of claim 10, further comprising, subsequent to configuring the configurable protocol engine, scheduling received service primitives on the basis of service primitive priority classification by placing a received service primitive or a derivative thereof into a queue with a corresponding priority classification, and by serving the queue according to the priority classification thereof.

12. The method of claim 10, wherein the function is determined by selecting the function from a plurality of functions on the basis of one of the configurable protocol engine configuration, or by receiving the function or an indication thereof from an external entity.

13. A memory that stores computer program instructions that when executed by a processor result in implementing at least part of a configurable protocol engine for constructing a protocol by performing operations that comprise:
defining and managing a configurable protocol engine configuration on the basis of available configuration information,
scheduling processing of received service primitives on the basis of the configurable protocol engine configuration, and
providing a plurality of functions to process data included in received service primitives in accordance with the configurable protocol engine configuration where a function is selected for inclusion in the protocol on the basis of at least one of a service level provided by the function and at least one cost factor related to the function, and where the configurable protocol engine configuration is defined on the basis of at least one of service requirements, a required quality of service, hardware resources and network resources.

14. The memory of claim 13, where execution of the computer program instructions when scheduling processing further comprises operations of maintaining a plurality of queues for the service primitives or derivatives thereof, and serving the primitives or derivatives thereof on the basis of their priority, where the primitives or derivatives thereof are placed into the plurality of queues on the basis of their priority.

15. An electronic device, comprising:
a processor configured with a memory that stores program instructions, where execution of the program instructions provides a configurable protocol engine to receive and process service primitives, said electronic device further comprising a transceiver to transfer data, said processor further configured to receive configuration information, to manage the configurable protocol engine configuration on the basis of the received configuration information, to schedule at least part of internal processing within the configurable protocol engine on the basis of the configurable protocol engine configuration, and to process received service primitives in accordance with the configurable protocol engine configuration, said processor further configured to select a number of functions from a plurality of functions in accordance with the configurable protocol engine configuration in order to implement a protocol, where functions are selected for inclusion in the protocol on the basis of at least one of a service level provided by the function and at least one cost factor related to the function, and
where the configurable protocol engine configuration is defined on the basis of at least one of service requirements, a required quality of service, hardware resources and network resources.

16. The electronic device of claim 15, said processor further configured to interface with at least one of an upper protocol layer and a lower protocol layer on the basis of the configurable protocol engine configuration.

17. The electronic device of claim 15, said processor further configured to perform the scheduling by maintaining a plurality of queues with different priorities for the service primitives or derivatives thereof, and to serve the primitives or derivatives thereof in the plurality of queues on the basis of their priority, where the primitives or derivatives thereof are placed into the plurality of queues on the basis of their priority.

18. The electronic device of claim 17, said processor further configured to utilize separate queues for each type of primitive.

19. The electronic device of claim 17, said processor further configured to place a primitive retrieved from a queue back into the queue if a function required by the primitive is already in use.

20. The electronic device of claim 15, embodied in a wireless communication device or in a computer.

* * * * *